(12) United States Patent
Kodavanty

(10) Patent No.: US 10,708,196 B2
(45) Date of Patent: Jul. 7, 2020

(54) MODIFICATIONS OF HEADEND FORWARDING RULES TO JOIN WIDE AREA NETWORK BRANCH HOSTS TO MULTICAST GROUPS

(71) Applicant: Hewlett Packard Enterprise Development LP, Houston, TX (US)

(72) Inventor: Vamsi Kodavanty, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 65 days.

(21) Appl. No.: 15/871,338

(22) Filed: Jan. 15, 2018

(65) Prior Publication Data
US 2019/0222537 A1    Jul. 18, 2019

(51) Int. Cl.
| | |
|---|---|
| *H04L 12/931* | (2013.01) |
| *H04L 12/761* | (2013.01) |
| *H04L 12/18* | (2006.01) |
| *H04L 12/46* | (2006.01) |
| *H04L 29/06* | (2006.01) |
| *H04L 29/12* | (2006.01) |
| *H04L 29/08* | (2006.01) |

(52) U.S. Cl.
CPC ............ *H04L 49/201* (2013.01); *H04L 12/18* (2013.01); *H04L 12/4633* (2013.01); *H04L 45/16* (2013.01); *H04L 61/256* (2013.01); *H04L 63/029* (2013.01); *H04L 67/10* (2013.01); *H04L 61/2521* (2013.01); *H04L 69/325* (2013.01)

(58) Field of Classification Search
CPC . H04L 49/201; H04L 12/4633; H04L 63/029; H04L 67/10; H04L 61/256; H04L 69/325
See application file for complete search history.

(56) References Cited

U.S. PATENT DOCUMENTS

| | | | |
|---|---|---|---|
| 9,300,483 | B2 | 3/2016 | Banavalikar et al. |
| 9,438,435 | B2 | 9/2016 | Iyer et al. |

(Continued)

OTHER PUBLICATIONS

Ethan Banks, "SDN: the Core Building Blocks," Network World, Jun. 28, 2013 [online], pp. 1-7, Retrieved on May 30, 2017 from the Internet: URL: <http://www.networkworld.com/article.

*Primary Examiner* — Ajit Patel
*Assistant Examiner* — Wilfred Thomas
(74) *Attorney, Agent, or Firm* — Tong, Rea, Bentley & Kim, LLC

(57) ABSTRACT

In an example, a system is described which includes a centralized controller, a first agent controller, and a second agent controller. The centralized controller executes a routing application to control routing of network traffic across links of a wide area network. The first agent controller is deployed at a branch location of the wide area network to notify the routing application when a host at the branch location requests membership in a multicast group. The second agent controller is deployed at a headend of the wide area network to modify a forwarding rule in response to an instruction from the routing application. The forwarding rule controls an interaction between the headend location and an upstream router to redirect network traffic associated with the multicast group in a manner that joins the host to the multicast group.

20 Claims, 4 Drawing Sheets

(56) References Cited

U.S. PATENT DOCUMENTS

| | | | |
|---|---|---|---|
| 2003/0147392 A1* | 8/2003 | Hayashi | H04L 12/185 370/390 |
| 2005/0089050 A1* | 4/2005 | Cheriton | H04L 12/18 370/397 |
| 2013/0322443 A1 | 12/2013 | Dunbar et al. | |
| 2014/0229605 A1* | 8/2014 | Besser | H04L 43/12 709/224 |
| 2016/0072669 A1* | 3/2016 | Saavedra | H04L 12/2867 709/220 |
| 2016/0315808 A1* | 10/2016 | Saavedra | H04L 47/24 |
| 2016/0373345 A1* | 12/2016 | Li | H04L 12/4641 |
| 2017/0048290 A1 | 2/2017 | Cui et al. | |
| 2017/0093589 A1* | 3/2017 | Asthana | H04L 12/185 |
| 2017/0187763 A1* | 6/2017 | Hsu | H04L 12/185 |
| 2017/0289228 A1* | 10/2017 | Romrell | H04L 65/605 |
| 2018/0375799 A1* | 12/2018 | Liu | H04L 45/16 |
| 2019/0166013 A1* | 5/2019 | Shaikh | H04L 41/50 |

\* cited by examiner

MODIFICATIONS OF HEADEND FORWARDING RULES TO JOIN WIDE AREA NETWORK BRANCH HOSTS TO MULTICAST GROUPS

BACKGROUND

In computer networking, multicast communications are communications in which data is addressed to a multicast group comprising multiple recipients simultaneously. The multicast communications may have either one source (i.e., one-to-many multicast) or multiple sources (i.e., many-to-many multicast). Network assisted multicast is a specific type of multicast communication in which one-to-many addressing and switching is implemented at either the data link layer (e.g., using Ethernet multicast addressing, Asynchronous Transfer Mode (ATM), point-to-multipoint (P2MP) virtual circuits, or Infiniband multicast) or the network layer (e.g., using Internet Protocol (IP) multicast).

DETAILED DESCRIPTION

The present disclosure broadly discloses a method and non-transitory computer-readable medium for modifying headend forwarding rules to join wide area network branch hosts to multicast groups. As discussed above, multicast communications are network communications in which data is addressed to a multicast group comprising multiple recipients simultaneously. As such, multicast communications may be especially useful in wide area networks (WANs) that connect one or more geographically distributed branches of an enterprise or organization. However, many network devices in a WAN may lack full multicast routing support. It may also be operationally infeasible to deploy multicast routing over the WAN links.

Examples of the present disclosure provide a novel method for deploying multicast forwarding in a software-defined WAN (SD-WAN) without using multicast routing. In one example, the SDN routing application includes a centralized WAN controller, as well as agent controllers that are deployed at both the WAN headend(s) (e.g., an enterprise data center) and WAN branch location(s). When a host device at a branch location wishes to join a multicast group (e.g., as a sender or as a recipient), the centralized WAN controller may modify a forwarding rule associated with an agent controller residing at a WAN headend accordingly. The forwarding rule controls an interaction between the agent controller residing at the headend and an upstream network layer router to redirect multicast traffic associated with the multicast group in a manner that joins the host residing at the branch location to the multicast group. The multicast traffic may comprise a plurality of data packets transmitted in accordance with the Internet Protocol (IP) communications protocol. In one example, the multicast traffic comprises IP version 4 (IPv4) or IP version 6 (IPv6) type traffic; however, in other examples, the multicast traffic may comprise traffic of types associated with other communications protocols, including other versions of IP.

Figure 1:
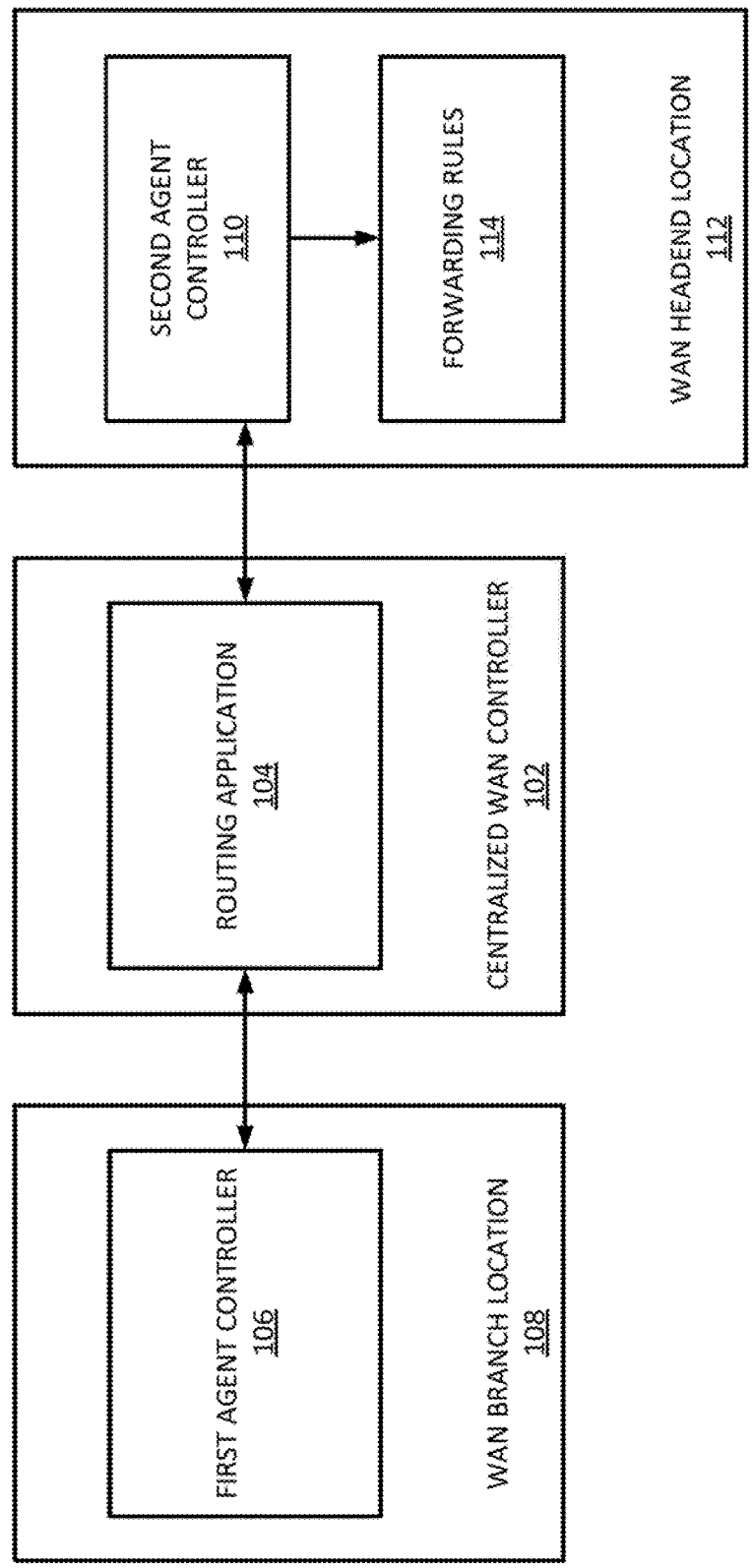
FIG. 1 is a block diagram of an example system of the present disclosure.

FIG. 1 illustrates an example system 100 of the present disclosure. In one example, the system 100 is deployed in a wide area network (WAN), such as a SD-WAN, and generally includes a centralized WAN controller in communication with a WAN branch location 108 and a WAN headend location 112. It should be noted that although one WAN branch location 108 and one WAN headend location 112 are illustrated in FIG. 1, any number of WAN branch locations and WAN headend locations may be in communication with the centralized WAN controller 102.

The centralized WAN controller 102 executes a routing application 104 that controls the routing of network traffic across the links of a wide area network to the WAN headend location 112. As described in greater detail in connection with FIGS. 2-4, the routing application 104 may be configured to enable multicast forwarding in the WAN without using multicast routing. The routing application 104 may run as a service in a cloud network.

The WAN branch location 108 connects one or more remote host devices, or "hosts" (e.g., including end user computing devices such as desktop computers, laptop computers, tablet computers, Voice over Internet Protocol (VoIP) phones, smart phones, wearable smart devices, and other devices) to the WAN. The WAN branch location 108 includes a first agent controller 106 that may cooperate with the routing application 104 to orchestrate forwarding of network traffic associated with a multicast group to and/or from one of the hosts at the WAN branch location 108.

The WAN headend location 112 aggregates the WAN branch locations, including the WAN branch location 108, into a core WAN router. The WAN headend location 112 includes a second agent controller 110 that may cooperate with the routing application 104 to modify one or more forwarding rules 114. The forwarding rules 114 control interactions between the second agent controller 110 and an upstream router (e.g., a network layer router) to redirect network traffic (e.g., IPv4 or IPv6 data packets) associated with a multicast group in a manner that joins a host at the WAN branch location 108 to the multicast group.

Figure 2:
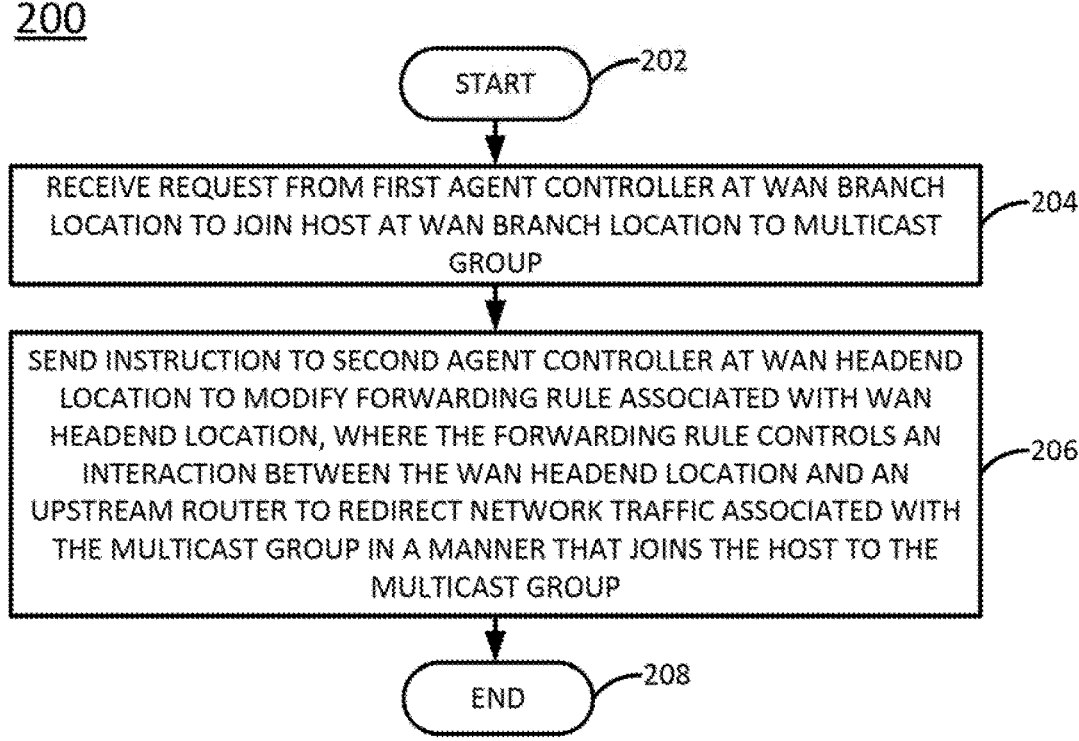
FIG. 2 illustrates a flowchart of an example method for enabling multicast forwarding in a wide area network.
Figure 5:
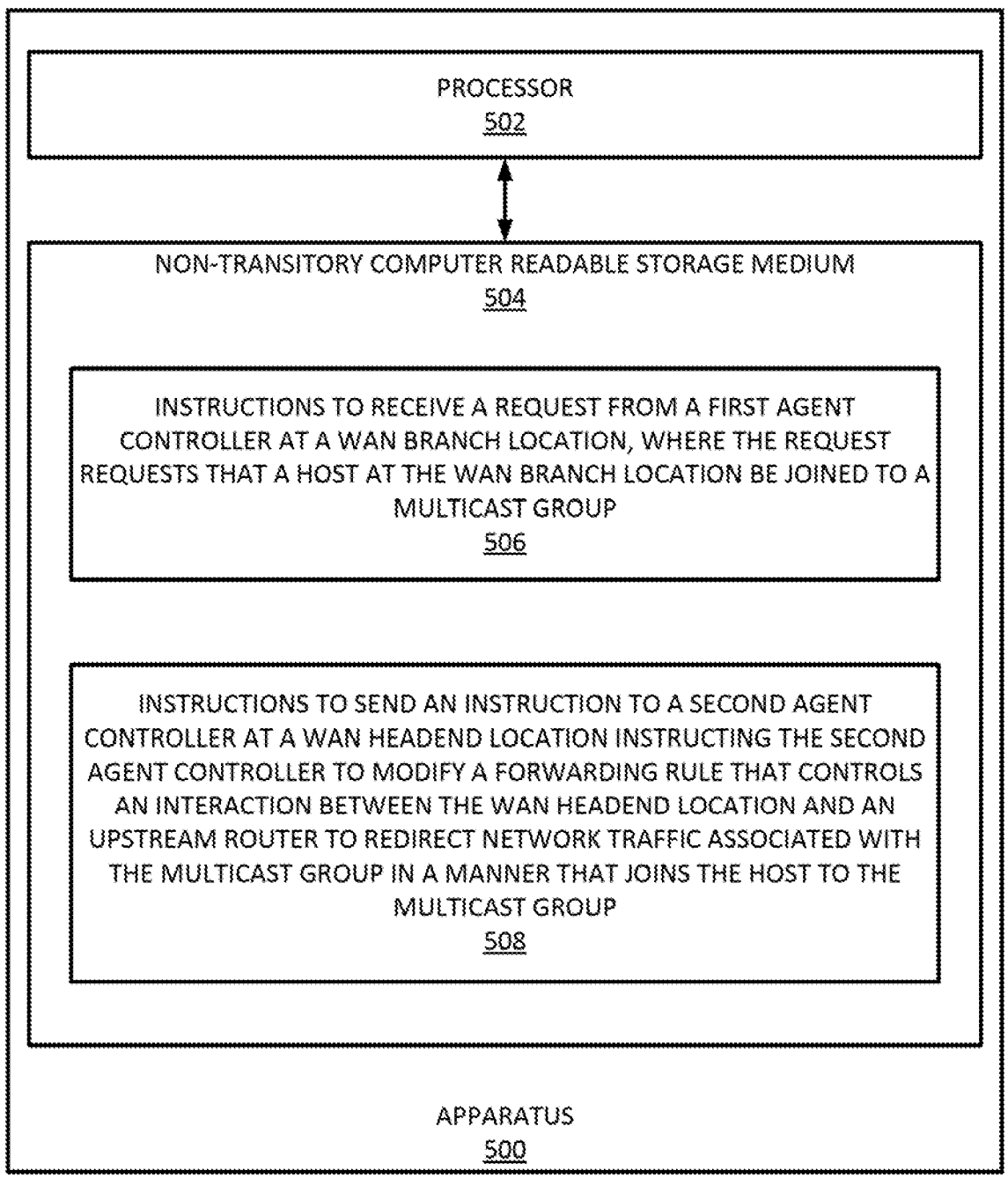
FIG. 5 depicts a high-level block diagram of an apparatus that can be transformed into a machine capable of performing the functions described herein.

FIG. 2 illustrates a flowchart of an example method 200 for enabling multicast forwarding in a wide area network. In one example, the method 200 may be performed by a centralized WAN controller, such as the centralized WAN controller 102 illustrated in FIG. 1, or by a computer as illustrated in FIG. 5 and discussed below. As such, reference is made in the discussion of the method 200 to various elements of FIG. 1. Such reference is made to facilitate understanding and is not intended to limit the means by which the method 200 may be performed.

At block 202, the method 200 begins. At block 204, the routing application 104 at the centralized WAN controller 102 receives a request from the first agent controller 106. The request requests that a host at the WAN branch location 108 be joined to a multicast group. The host may request to join the multicast group as a receiver (e.g., such that the host serves as a destination for network traffic associated with the multicast group) or as a sender (e.g., such that the host serves as a source for network traffic associated with the multicast group).

Figure 3:
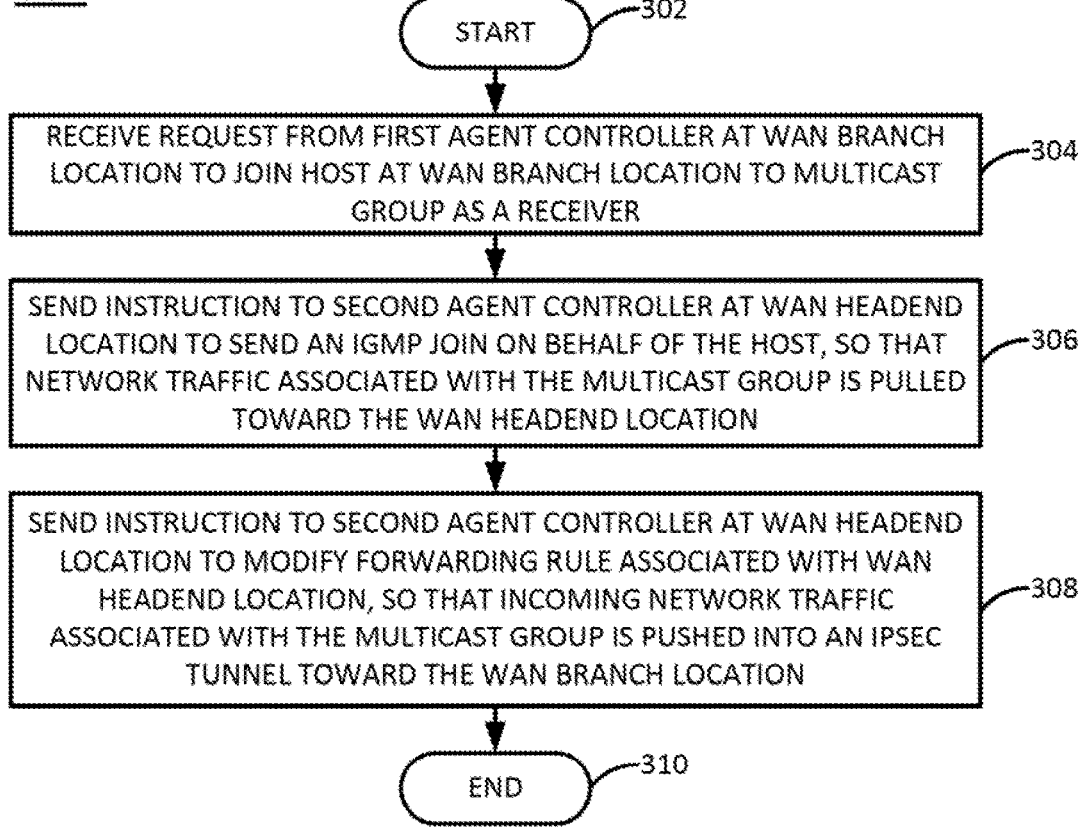
FIG. 3 illustrates a flowchart of an example method for joining a host at a branch location in a wide area network to a multicast group.
Figure 4:
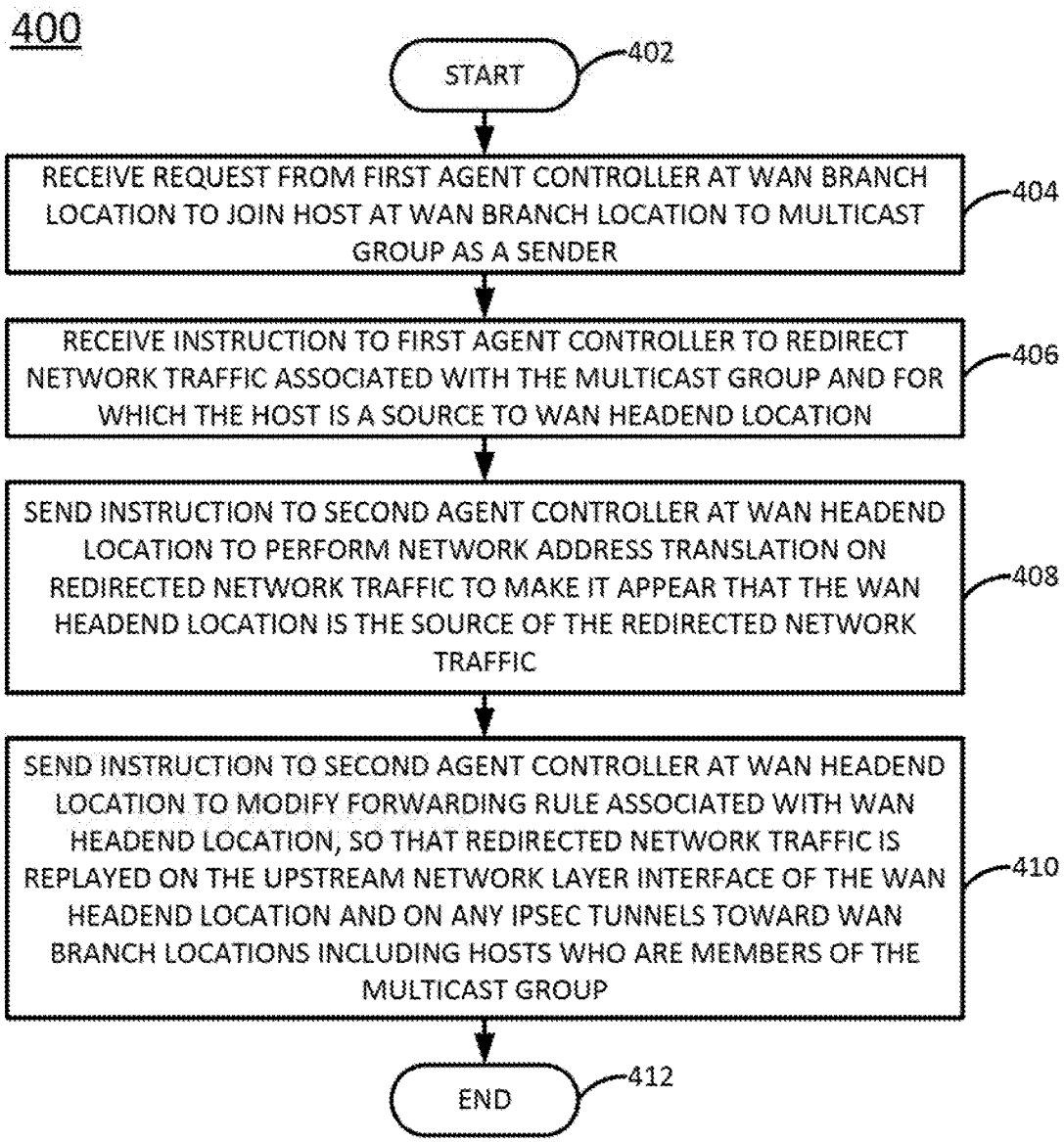
FIG. 4 illustrates a flowchart of another example method for joining a host at a branch location in a wide area network to a multicast group.

In block 206, the routing application 104 sends, in response to the request, an instruction to the second agent controller 110. The instruction instructs the second agent controller 110 to modify a forwarding rule associated with the WAN headend location 112. As discussed above, the forwarding rule may control an interaction between the WAN headend location 112 and an upstream router (e.g., a network layer router) to redirect network traffic (e.g., IPv4 or IPv6 data packets) associated with the multicast group in a manner that joins the host to the multicast group. The specific manner in which the forwarding rule is modified may vary depending on whether the host has requested to join the multicast group as a receiver or as a sender. FIG. 3, for instance, illustrates a more detailed method for joining the host to the multicast group as a receiver, while FIG. 4 illustrates a more detailed method for joining the host to the multicast group as a sender. The centralized WAN controller 102 and/or the routing application 104 may also take additional actions to enable multicast forwarding to and/or from the host depending on whether the host has requested to join the multicast group as a receiver or as a sender.

The method 200 ends in block 208.

FIG. 3 illustrates a flowchart of an example method 300 for joining a host at a branch location in a wide area network to a multicast group. In one example, the method 300 may be performed by a centralized WAN controller, such as the centralized WAN controller 102 illustrated in FIG. 1, or by a computer as illustrated in FIG. 5 and discussed below. As such, reference is made in the discussion of the method 300 to various elements of FIG. 1. Such reference is made to facilitate understanding and is not intended to limit the means by which the method 300 may be performed.

At block 302, the method 300 begins. At block 304, the routing application 104 at the centralized WAN controller 102 receives a request from the first agent controller 106. The request requests that a host at the WAN branch location 108 be joined to a multicast group as a receiver (e.g., such that the host serves as a destination for network traffic associated with the multicast group). The request may also identify WAN headend location 112 as a preferred WAN headend location for the host.

In block 306, the routing application 104 sends an instruction to the second agent controller 110 to send an Internet group management protocol (IGMP) join on behalf of the host. The IGMP join will operate to pull network traffic (e.g., IPv4 or IPv6 data packets) associated with the multicast group towards the WAN headend location 112. In one example, depending on the protocol independent multicast (PIM) mode used in the WAN, the IGMP join may be an IGMPv2 or an IGMPv3 join. Other types of IGMP joins are also possible.

In block 308, the routing application 104 sends an instruction to the second agent controller 110 to modify the forwarding rules 114 at the WAN headend location 112 so that incoming network traffic associated with the multicast group is pushed or redirected by the router(s) at the WAN headend location 112 into a secure tunnel, such as an Internet Protocol security (IPsec) tunnel, toward the WAN branch location 108.

The method 300 ends in block 310.

FIG. 4 illustrates a flowchart of another example method 400 for joining a host at a branch location in a wide area network to a multicast group. In one example, the method 400 may be performed by a centralized WAN controller, such as the centralized WAN controller 102 illustrated in FIG. 1, or by a computer as illustrated in FIG. 5 and discussed below. As such, reference is made in the discus-sion of the method 400 to various elements of FIG. 1. Such reference is made to facilitate understanding and is not intended to limit the means by which the method 400 may be performed.

At block 402, the method 400 begins. At block 404, the routing application 104 at the centralized WAN controller 102 receives a request from the first agent controller 106. The request requests that a host at the WAN branch location 108 be joined to a multicast group as a sender (e.g., such that the host serves as a source for network traffic associated with the multicast group). The request may also identify WAN headend location 112 as a preferred WAN headend location for the host.

At block 406, the routing application 104 sends an instruction to the first agent controller 106 to redirect network traffic associated with the multicast group and for which the host is the source to the WAN headend location 112.

At block 408, the routing application 104 sends an instruction to the second agent controller 110 to perform network address translation (NAT) for the redirected network traffic to make it appear that the WAN headend location 112 is the source of the redirected network traffic. For instance, the second agent controller 110 may translate the host address on data packets of the redirected network traffic into an address of the WAN headend location's upstream network layer interface. Thus, the first-hop upstream router (e.g., network layer router) beyond the WAN headend location 112, which expects the source of the redirected network traffic to be a directly connected subnet (in order for PIM source registration to work as expected), will view the WAN headend location 112 as the source of the redirected network traffic.

At block 410, the routing application 104 sends an instruction to the second agent controller 110 to modify the forwarding rules 114 at the WAN headend location 112 so that the redirected network traffic is replayed on the upstream network layer interface of the WAN headend location 112. Upstream, regular PIM mechanisms may be used to deliver the redirected network traffic to members of the multicast group. In addition, the modified forwarding rules 114 may replay the redirected network traffic on any secure tunnels, such as IPsec tunnels, toward WAN branch locations (which may or may not include WAN branch location 108) including hosts who are members of the multicast group.

The method 400 ends at block 412.

It should be noted that although not explicitly specified, some of the blocks, functions, or operations of the methods 300 and 400 described above may include storing, displaying and/or outputting for a particular application. In other words, any data, records, fields, and/or intermediate results discussed in the method can be stored, displayed, and/or outputted to another device depending on the particular application. Furthermore, blocks, functions, or operations in FIGS. 3 and 4 that recite a determining operation, or involve a decision, do not necessarily imply that both branches of the determining operation are practiced. Moreover, blocks, functions, or operations of the above described method(s) can be combined, separated, and/or performed in a different order from that described above, without departing from the examples of the present disclosure.

FIG. 5 depicts a high-level block diagram of an apparatus that can be transformed into a machine capable of performing the functions described herein. In one example, the apparatus 500 may be the centralized WAN controller 102 of FIG. 1. In one example, the apparatus 500 may include a processor 502 and a non-transitory computer readable storage medium 504. The non-transitory computer readable storage medium 504 may include instructions 506 and 508 that, when executed by the processor 502, cause the processor 502 to perform various functions.

In one example, the instructions 506 may include instructions to receive a request from a first agent controller at a WAN branch location, where the request requests that a host at the WAN branch location be joined to a multicast group. The instructions 508 may include instructions to send an instruction to a second agent controller at a WAN headend location, where the instruction instructs the second agent controller to modify a forwarding rule that controls an interaction between the WAN headend location and an upstream router to redirect network traffic associated with the multicast group in a manner that joins the host to the multicast group It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A controller system, comprising:
 a processor; and
 a storage device coupled to the processor and storing instructions, which when executed by the processor cause the processor to perform a method, the method comprising:
 controlling routing of network traffic across links of a wide area network based on a routing application;
 receiving, from a first agent controller deployed at a branch location of the wide area network, a notification message indicating that a host at the branch location has requested membership in a multicast group;
 obtaining, from the routing application based on the notification message, an instruction for redirecting multicast traffic of the multicast group to allow the host to join the multicast group; and
 sending, to a second agent controller deployed at a headend location in the wide area network, a control message for modifying a forwarding rule based on the instruction from the routing application, wherein the forwarding rule controls an interaction between the headend location and an upstream router associated with the multicast group.

2. The controller system of claim 1, wherein the upstream router is a network layer router.

3. The controller system of claim 1, wherein the wide area network is a software-defined network (SDN), and wherein the controller system is configured to control the SDN.

4. The controller system of claim 1, wherein the interaction indicated by the forwarding rule joins the host to the multicast group without the use of multicast routing.

5. The controller system of claim 1, wherein the routing application runs as a service in a cloud network.

6. A method of a centralized controller managing multicast traffic in a wide area network, comprising:
 controlling routing of network traffic across links of the wide area network based on a routing application;
 receiving, from a first agent controller deployed at a branch location in the wide area network, a notification message indicating that a host at the branch location has requested membership in a multicast group; and
 obtaining, from the routing application based on the notification message, an instruction for redirecting multicast traffic of the multicast group to allow the host to join the multicast group; and
 sending, to a second agent controller deployed at a headend location in the wide area network, a control message for modifying a forwarding rule based on the instruction from the routing application, wherein the forwarding rule controls an interaction between the headend location and an upstream router associated with the multicast group.

7. The method of claim 6, wherein the membership request requests that the host join the multicast group as a receiver.

8. The method of claim 7, wherein the instruction further comprises:
 an instruction to send a join on behalf of the host to direct traffic associated with the multicast group to the headend location.

9. The method of claim 8, wherein the join is a join request based on an internet group management protocol (IGMP).

10. The method of claim 8, wherein modifying the forwarding rule causes network traffic associated with the multicast group to be forwarded by a router of the headend location into a secure tunnel toward the branch location.

11. The method of claim 10, wherein the secure tunnel is a internet protocol security (IPSec) tunnel.

12. The method of claim 6, wherein the membership request requests that the host join the multicast group as a sender.

13. The method of claim 12, further comprising:
 sending, an instruction to the first agent controller to redirect network traffic associated with the multicast group and for which the host is a source to the headend location.

14. The method of claim 13, wherein the instruction to the second agent controller further comprises:
 an instruction to perform network address translation for the network traffic in such a way that the headend location appears as the source.

15. The method of claim 14, wherein modifying the forwarding rule causes the network traffic to be replayed on an upstream network layer interface of the headend location.

16. The method of claim 15, wherein modifying the forwarding rule further causes the network traffic to be forwarded via a secure tunnel toward the branch location.

17. A non-transitory computer readable storage medium to store instructions that, when executed by a computer, cause the computer to perform a method, the method comprising:
 controlling, by a centralized controller in a wide area network, routing of network traffic across links of a wide area network based on a routing application;
 receiving, from a first agent controller deployed at a branch location in the wide area network a notification message indicating that a host at the branch location has requested membership in a multicast group; and
 obtaining, from the routing application based on the notification message, an instruction for redirecting multicast traffic of the multicast group to allow the host to join the multicast group; and
 sending, to a second agent controller deployed at a headend location in the wide area network, a control message for modifying a forwarding rule based on the instruction from the routing application, wherein the forwarding rule controls an interaction between the headend location and an upstream router associated with the multicast group.

18. The non-transitory computer readable storage medium of claim 17, wherein the membership request requests that the host join the multicast group as a receiver, and the instruction comprises:
   an instruction to send a join on behalf of the host to obtain network traffic associated with the multicast group towards the headend location; and
   an instruction to forward, by a router of the headend location, the network traffic via a secure tunnel toward the branch location.

19. The non-transitory computer readable storage medium of claim 17, wherein the membership request requests that the host join the multicast group as a sender, and wherein the method further comprises:
   sending an instruction to the first agent controller to redirect the network traffic associated with the multicast group and for which the host is a source to the headend location.

20. The non-transitory computer readable storage medium of claim 19, wherein the instruction comprises:
   an instruction to perform network address translation for the network traffic in such a way that the headend location appears as the source; and
   an instruction to replay the network traffic on an upstream network layer interface of the headend location.

* * * * *